(12) United States Patent
Zeffler et al.

(10) Patent No.: US 7,729,615 B1
(45) Date of Patent: Jun. 1, 2010

(54) METHOD FOR TRANSMITTING OVERHEAD INFORMATION FOR WAVELENGTH DIVISION MULTIPLEX NETWORKS FOR FIBRE-OPTIC INFORMATION TRANSMISSION

(75) Inventors: Klaus-Peter Zeffler, Darmstadt (DE); Heiko Dassow, Griesheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/462,337

(22) PCT Filed: May 11, 1998

(86) PCT No.: PCT/EP98/02737

§ 371 (c)(1),
(2), (4) Date: Apr. 17, 2000

(87) PCT Pub. No.: WO99/04526

PCT Pub. Date: Jan. 28, 1999

(30) Foreign Application Priority Data

Jul. 15, 1997 (DE) ................................ 197 30 294

(51) Int. Cl.
*H04J 14/02* (2006.01)
*H04J 14/04* (2006.01)

(52) U.S. Cl. .............................. 398/75; 398/34; 398/98

(58) Field of Classification Search ................. 370/528, 370/521, 517, 514, 249, 503, 437, 441; 359/123; 341/73; 398/30, 32, 47, 75, 79–97, 34, 98, 398/102
See application file for complete search history.

(56) References Cited

U.S. PATENT DOCUMENTS 3,636,524 A * 1/1972 Holland ...................... 370/521

3,995,120 A * 11/1976 Pachynski, Jr. ............. 370/517
4,151,373 A * 4/1979 Widmer et al. .............. 370/514

(Continued)

FOREIGN PATENT DOCUMENTS

EP 0 414 333 2/1991

(Continued)

OTHER PUBLICATIONS

Acampora, Anthony S. "A high capacity metropolitan area network using lightwave transmission and time multiplexed switching." Communications, IEEE Transactions on, vol. 38, No. 10, Oct. 1990: 1761-1770.*

(Continued)

*Primary Examiner*—Leslie Pascal
(74) *Attorney, Agent, or Firm*—Kenyon & Kenyon LLP

(57) ABSTRACT

A method for transmitting signaling and control information for wavelength-division multiplex networks for optical, fiber-bound information transfer in digitized form, the signaling and control information being transmitted via the same optical channel, particularly with the same wavelength, as the useful information, but being encoded and decoded independently thereof, with the result that the control and signaling information can also be accessed independently of the useful information. The use of a time-division multiplex method allowing the different encoding of useful information and control information makes it possible considerably to reduce the technical complexity of passive optical network elements with regard to the routing of the signaling and control information. This method permits the simple, low-cost and transparent transmission of signaling and control information in the optical WDM network.

7 Claims, 2 Drawing Sheets

U.S. PATENT DOCUMENTS

| | | | | |
|---|---|---|---|---|
| 4,330,858 | A | * | 5/1982 | Choquet ................... 370/528 |
| 5,144,305 | A | * | 9/1992 | Gotz et al. ................... 341/73 |
| 5,144,466 | A | * | 9/1992 | Nakamura et al. .......... 359/123 |
| 5,323,383 | A | * | 6/1994 | Satoh ......................... 370/249 |
| 5,535,032 | A | | 7/1996 | Böttle |
| 5,576,875 | A | * | 11/1996 | Chawki et al. ................ 398/72 |
| 5,644,573 | A | * | 7/1997 | Bingham et al. ............ 370/503 |
| 5,663,820 | A | * | 9/1997 | Shiragaki ..................... 398/50 |
| 5,721,732 | A | * | 2/1998 | Emeott et al. ............... 370/437 |
| 5,757,800 | A | * | 5/1998 | Ishikawa et al. ............. 370/441 |
| 5,828,670 | A | * | 10/1998 | Narasimha et al. .......... 370/516 |
| 6,522,666 | B1 | * | 2/2003 | Tzannes et al. ............. 370/471 |

FOREIGN PATENT DOCUMENTS

| | | |
|---|---|---|
| EP | 0 547 527 | 6/1993 |
| EP | 0 573 752 | 12/1993 |

OTHER PUBLICATIONS

Kamise, C. et al. "Practical implementation of the WD/TD optical network in a broadcast station." Broadcasting Convention, 1995. IBC 95., International, Sep. 14-18, 1995: pp. 458-463.*

Shimosaka, N. et al. "Photonic wavelength-division and time-division hybrid switching system utilizing coherent optical detection." IEEE Photonics Technology Letters, Apr. 1990: pp. 301-303.*

Siperko, C. "LaserNet—A fiber optic intrastate network (planning and engineering considerations)." IEEE Communications Magazine. May 1985, vol. 23, No. 5: 31-45.*

Glisic, S. et al. "Efficiency of Digital Synchronous Communication Systems." IEEE Transactions on Communications, [legacy, pre—1988]. vol. 35, No. 6, Jun. 1987: 679-684.*

M. J. Chawki et al., "Management protocol of a reconfigurable WDM ring network using SDH overhead bytes", OFC 96 Technical Digest FD3, p. 317.

Draft Recommendation ITU-T G.MCS, Geneva, Jun. 1996.

S. Johansson, "Transport Network Involving a Reconfigurable WDM Network Layer—A European Demonstration", Journal of Lightwave Technology, vol. 14, No. 6, Jun. 1996, pp. 1341-1348.

Chan et al., "A Practical Passive Surveillance Scheme for Optically Amplified Passive Branched Optical Networks," IEEE Photonics Technology Letters, vol. 9, No. 4, Apr. 1997, pp. 526-528.

* cited by examiner

METHOD FOR TRANSMITTING OVERHEAD INFORMATION FOR WAVELENGTH DIVISION MULTIPLEX NETWORKS FOR FIBRE-OPTIC INFORMATION TRANSMISSION

BACKGROUND INFORMATION

The present invention relates to a method for transmitting signaling and control information for wavelength-division multiplex (WDM) networks for use in optical, fiber-bound information transfer in digitized form.

Various methods are known from the field of transmission technology for transmitting a plurality of independent signals in order to transfer data, speech, text or images over a common medium. This can be achieved in that the useful information underlying the signals differs with regard to its timing slot, frequency or coding. Frequently, it is necessary for so-called signaling and control information (overhead information) to be transmitted in addition to the useful information. Such overhead information can be used to control the participating network elements, to identify the transmitted signals or to determine the transmission quality. Using conventional digital transmission methods, such as PDH and SDH time-division multiplex methods, overhead information can be easily transmitted in addition to the useful information by employing time slots reserved for this purpose. Methods of this kind can be implemented at very low cost using electronic digital technology.

In optical transmission technology, it is known for a plurality of signals to be transmitted via a common medium, the optical fiber, in that, prior to optical modulation, a plurality of signals are multiplexed using conventional transmission technology means. The disadvantage of this method is that the individual signals or the overhead information that is contained cannot be accessed using optical methods. Only after it has been converted back into an electrical signal can the overhead information be read and the individual partial signals be routed independently of each other.

Much more universal is the use, tested in initial reference systems, of an optical frequency- or wavelength-division multiplex method, in which the useful information is modulated with the aid of lasers having different transmission frequencies. Consequently, it is possible using simple, passive optical filters to select the signals transmitted via an optical fiber in accordance with their frequency. With the aid of such a wavelength-division multiplex (WDM) network, it is possible for the individual signals to be transmitted transparently with regard to their coding. Therefore, many signals differently encoded in different terminal equipment facilities (TE) can be transferred simultaneously via a transmission link, as long as they differ with respect to the wavelength used.

Not yet implemented satisfactorily for WDM networks is the overhead channel for the transmission of signaling and control information. When optically transmitting WDM signals, it is not possible according to the present state of the art for the overhead information, for example using PCM or SDH techniques, to be transmitted together with the useful information. The reason this fails is that—in contrast to the fixed frame structure of such electronic transmission systems - any encoding methods at all are permitted in the WDM network for the useful signal. Another aspect, however, is the absence of powerful digital components for optical signal processing. Consequently, consideration is presently being given to switching a separate overhead channel with its own carrier frequency through the WDM network. What is problematic about this approach is that the overhead information is transmitted independently of the useful information. This means that it is just as difficult to detect frequency-selective faults as it is to detect the incorrect routing of a useful signal. Furthermore, passive optical coupling elements pose the potential problem of superposition of two overhead signals. The technical outlay required to solve this problem bears no relationship to the low cost of such elements.

The present invention relates to networks used for the optical, fiber-bound transfer of digitized information. Characteristic of a wavelength-division multiplex (WDM) network is the fact that useful information can be transmitted in the form of signals, independently of each other, via one fiber, by making use of different optical wavelengths. In this context, purely optical methods based on the different wavelengths of the signals can be used to route the useful information in network elements in different ways.

In the technical implementation of a transmission network, it is necessary that not only the useful information be transmitted via the medium, but the signaling and control information, referred to as "overhead", as well. For this, one knows of several possible approaches for use in an optical WDM network. These are elucidated briefly in the following:

From Chawki, M J, Tholey, V Le Gac I: *Management protocol of a reconfigurable WDW ring network using SDH overhead bytes; OFC 96 Technical Digest FD*3, it is known to reserve additional transmission capacity for the signaling and control information when encoding the useful information. The optical WDM network is able to access this reserved bandwidth in that the useful signal is decoded and the signaling and control information is added or read out. However, this method requires a substantial technical outlay. Each accessing of the overhead information requires a conversion between the optical and electrical encoding of the complete useful signal. If the optical WDM network is used by different kinds of terminals (TE) having different encoding variants, then a corresponding number of different techniques for accessing the overhead information must be implemented in parallel.

The *Draft Recommendation ITU-T G.MCS Geneva* June, 1996 proposes that the signaling and control information be transmitted in a separate control channel, via the same or a different medium. S. Johansson: *Transport Network Involving a Reconfigurable WDM Layer, Journal of Lightwave Technology* 14 (1996) 6, pp.].:1341-1349 proposes that the signaling and control information be transmitted using so-called pilot tones, in an unused frequency range of the fiber. However, there are some desirable functionalities that cannot be implemented with either of these methods. For example, the transmission quality for the basic channel cannot be inferred from the transmission quality of the overhead information. In addition, not all configuration errors, such as mixing-up of channels, are able to be detected through the separate transfer of the control and signaling information.

SUMMARY OF THE INVENTION

The object of the present invention, therefore, is to provide a method for transmitting signaling and control information which, without requiring structural changes to the optical network, enables signaling and control information to be transmitted with little outlay and transparently, such that it can be encoded using any encoding methods and can be individually evaluated by the respective network terminators and network elements, it also being possible for conclusions to be drawn with regard to the transmission quality of the basic channel. To this end, the intention is to reduce the technical complexity of passive optical network elements with respect to the routing of the signaling and control information.

The object of the present invention is achieved by a method for transmitting signaling and control information for wavelength-division multiplex (WDM) networks for optical, fiber-bound information transfer in digitized form, useful information being optically encoded or decoded using a terminal and, in the form of an optical signal of defined fundamental wavelength, being fed into or removed from the optical network at a network terminator, a plurality of signals of different wavelengths being transmitted collectively in an optical fiber, the signaling and control information being generated or analyzed in the network terminator or in a further network element and being fed into or removed from the network, in that, using a time-division multiplex method, the signaling and control information is transmitted with the same fundamental wavelength via the same network components as the corresponding useful information signal, the signaling and control information being able to be modulated independently of the useful information.

The method according to the present invention, therefore, is distinguished by the fact that control and signaling information is transmitted in the same optical WDM channel as the useful signal. Consequently, in contrast to transmitting the overhead information in a separate channel, e.g. with a different wavelength, it is possible for configuration errors on the optical network to be detected, because the control signal takes the same optical path via the same network components as the useful signal. An essential element of this multiplex method is also the fact that different modulation/encoding methods can be used for the useful signal and the overhead information.

Instead of the useful signal, the overhead information is transmitted via the medium at predetermined instants in time. A characteristic signal sequence enables the overhead channel to be detected with respect to time in the signal stream of the useful signal. By periodically repeating the overhead channel, misinterpretations of useful signals can be excluded—following synchronization—as a characteristic signal sequence. The method according to the present invention is thus adapted to the requirements of an optical channel with regard to transparency for useful signals of different terminals of the WDM network.

The principal advantage attainable with the present invention is that the overhead information in an optical WDM network need not be routed separately in terms of frequency from the useful signal. No additional technical outlay whatsoever is required for routing the overhead information for active or passive elements which do not need to access the information contained in the overhead. Due to the fact that, for the control—and signaling-information channel, the same technical transmission properties of the medium apply as they do for the useful signal, direct inferences can be made about the transmission quality of the channel for the useful signal based on the bit error rate in the overhead information. Nevertheless, with these methods, there are no essential restrictions with regard to the type of encoding of the useful signal which is performed by the terminal (TE) for the WDM network.

The fact that the control and signaling information can be encoded using a different technical method than the useful information means that the control and signaling information can be accessed using simple technical means. Therefore, the control and signaling information does not need to be encoded and decoded with the same high degree of technical complexity as might be required for the useful information due to functional requirements.

The signaling and control information is preferably transmitted at regular time intervals T for a duration of $T_s$. In this context, it is advantageous that T be a multiple of the characteristic clock pulse duration of the useful information. This means that the transmitting clock pulse of the useful signal is used to synchronize the time-division multiplex method for the overhead channel, in that the clock pulse information from the useful signal is used within the WDM network to synchronize the overhead channel. For this purpose, the time-division multiplex method is dynamically adapted to the respective transmitting clock pulse of the useful signal. Synchronization to the useful signal can take place in a learning phase in which a characteristic signal is transmitted at very short intervals. Following synchronization, the time interval of the characteristic signal is gradually increased in one or more steps.

To minimize the impact on the basic channel as a result of its brief use for transmitting the overhead information, a longest possible time interval should be selected between the individual time slots for the overhead information. To maintain the synchronism between transmitter and receiver, the clock pulse deviation during the transmission pauses of the overhead channel must be kept as small as possible. The technical implementation is significantly simplified if the clock pulse information of the useful signal is used to synchronize the oscillators located at the transmitters and receivers of the overhead information. This is possible because, in the case of the optical carrier modulations used today, the transmitting clock pulse of the useful signal is within a frequency range to be clearly defined. Therefore, the overhead signal can be adapted to the timing of the useful signal with minimal expenditure for circuit engineering.

The method according to the present invention also offers two alternatives for preventing interference in the transmission of useful data, in spite of the useful signal being suppressed for a time in order to transmit the overhead information.

At the appropriate instants, the overhead information is transmitted, instead of the useful signal, the useful signal either being overwritten or suppressed. The transmitting terminal equipment, which encodes the useful signal, has no knowledge of the instants when its own signal is not transmitted. From the standpoint of the receiving terminal equipment, this has the effect of superposition of an interference signal. By using an error-tolerant line code optimized for this ostensible interference, the receiving terminal equipment is able to reconstruct the original useful signal, in spite of the interference through the overhead channel.

By applying error correction methods, as used, for example, to transmit data over long-distance optical-fiber submarine cables, one can also correct the errors produced by the time slot of the overhead channel. To ensure the performance reliability of this method, the overhead information must be so distributed with respect to time that a specified mean interference rate of the basic channel is not exceeded. In addition, an error correction algorithm should be used, which is optimized for this type of block interference produced by the overhead signal.

Alternatively, bandwidth can be reserved for the overhead channel by specifying time gaps in the transmitted signal. Instead of the useful signal, the overhead information is transmitted. In a dynamic method, the transmitting terminal and the downstream network terminator agree on the instant when the overhead information may be transmitted. To effect this, the terminal leaves the required time slots free and signals their timing to the network terminator. Another possibility is that the network terminator notifies the terminal when the overhead signal is inserted, so that the data to be transmitted can be briefly buffered during the time the optical channel is used to transmit the overhead information.

This embodiment of the method according to the present invention prevents interference of the useful signal by briefly buffering the useful information in the transmitter during the transmission pause resulting from transmission of the overhead signal. For this, shift registers can be used, such as those used in switching technology to synchronize input signals in the case of a digital switching unit.

The technical implementation is further simplified when the overhead information is transmitted by the terminals, instead of by the network terminators. In this context, it is not the network terminator that inserts the overhead information into the useful signal of the terminal equipment, but the terminal itself which assumes this task. To this end, the overhead information is communicated from the network terminator located at the transmitter to the transmitting terminal, for the purpose of optical modulation. The receiving terminal selects the overhead information from the useful signal, and transmits it to the upstream network terminator.

This version of the method according to the present invention advantageously eliminates the need for yet a further laser to modulate and transmit the overhead information in the network terminator, in addition to the already existing lasers in the terminal. Accordingly, an additional detector at the opposite network terminator is not needed to decode the overhead information. This can be done by the downstream terminal. In addition, —if there is no need for the overhead information to be directly accessed in the optical WDM network—the choice of encoding of the overhead information can be left to the terminal.

DETAILED DESCRIPTION

Figure 1:
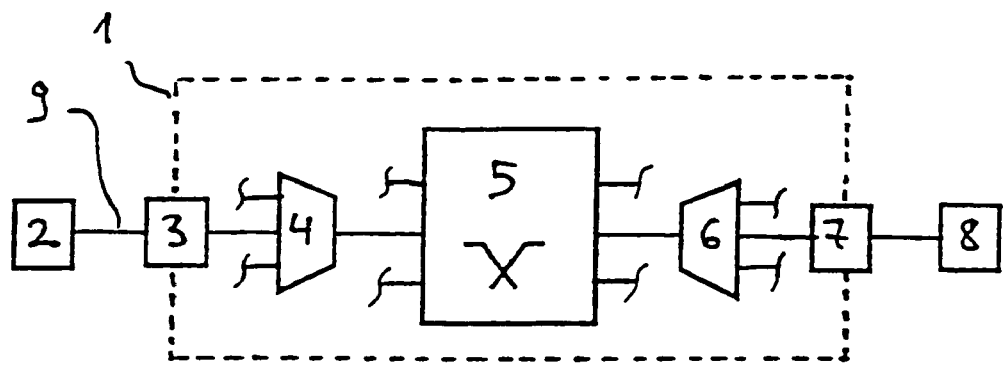
FIG. 1 shows functional elements of an optical WDM network.

FIG. 1 shows the basic functional elements of an optical wavelength-division multiplex (WDM) network 1. Terminal 2 transmits and receives useful information at a defined wavelength via an optical fiber 9, only the information direction in which terminal 2 acts as transmitter being described in the following. The useful signal, which may, for example, be in the form of an electrical signal, is optically encoded in terminal 2. In network terminator 3, the optical signal is monitored and, if necessary, adapted to the requirements of the WDM network. Optical multiplexer 4 enables a plurality of signals to be transmitted via the same fiber on the basis of their different wavelengths. Optical cross connect (OXC) 5 permits the flexible spatial routing of the signals in accordance with their optical wavelengths. Optical multiplexer 6, downstream from the OXC, distributes the signals, encoded with different wavelengths, to various outgoing optical fibers.

Receiver-end network terminator 7 performs a function analogous to that of the transmitter-end network terminator 3 and transfers the signals to receiver-end terminal 8. This terminal 8 decodes the optical signal and converts it into an electrical signal, which can be further processed.

When the method according to the present invention is applied, network terminator 3 transmits signaling and control information (overhead information) via the same optical channel, i.e., at the same wavelength as upstream terminal 2, in order to control and monitor the useful signal transmission initiated by terminal 2. The overhead information to be transmitted is either supplied externally, for example as an electrical signal, to network terminator 3, or is directly generated, locally, on the basis of the internal state of the equipment. Network terminator 3, in the same way as terminal 2, has a laser for encoding the overhead information into an optical signal. The modulation method used is not subject to any restrictions and, in particular, is independent of the method used for encoding the useful signal in terminal 2. Therefore, one can select a technically less complex encoding method than that used to transmit the useful signal. A time-division multiplex method is used for transmitting the overhead information via the same optical channel as the useful information. Either transmitting terminal 2 leaves time slots free in the useful signal and notifies network terminator 3 where the slots are, enabling it to insert the overhead information into the time gaps, or, alternatively, network terminator 3 can overwrite the useful information with overhead information.

At the receiving end, the overhead information is decoded and evaluated at network terminator 7. In the data stream of the useful signal, network terminator 7 detects signal sequences typical of the overhead information, thereby synchronizing the transmitting and receiving-end network terminators 3 and 7. Once synchronization has taken place, receiving-end network terminator 7 evaluates the optical signal, containing the overhead and useful information, at regular time intervals. This enables it to detect the overhead information as such, and further process it. For example, after being reconverted into electrical signals, the control signals are converted, and the transmission quality is checked. The entire optical signal, made up of overhead and useful information, is transferred by network terminator 7 to the receiver-end terminal equipment, which reconverts and evaluates the useful information. The interference in the useful signal caused by the transmission of the overhead information is preferably eliminated by suitable error correction algorithms or is minimized by the use of a line code adapted to this type interference in order to modulate the useful information.

Figure 2:
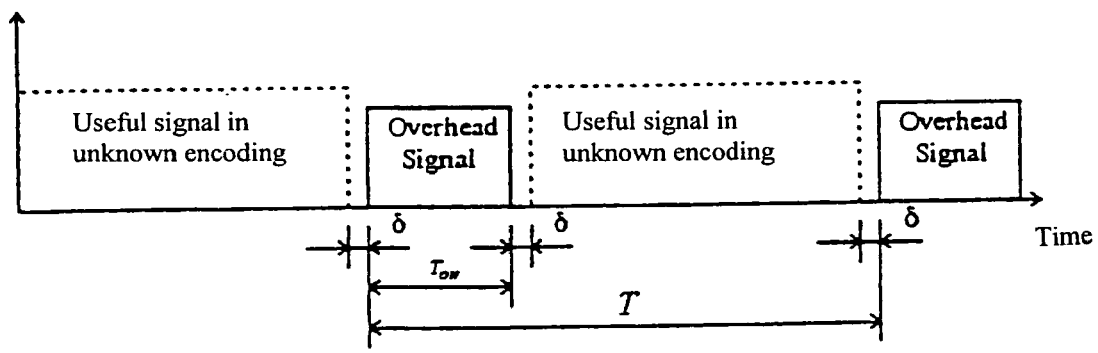
FIG. 2 depicts the principal chronological sequence for signal transmission in accordance with the method of the present invention.

FIG. 2 shows the basic time sequence for signal transmission in the method according to the present invention. At regular time intervals T, the transmission of the useful signal is interrupted for the duration $T_{OH}+2\delta$, and the control and signaling information is transmitted for a time duration of $T_{OH}$. In this context, the variable $\delta$ identifies the time interval between suppression of the useful signal and transmission of the overhead information. To enhance the efficiency of the method, one must select the smallest possible values for $\delta$ and $T_{OH}$ and the largest possible value for T, to minimize interference of the useful signal.

The useful-signal and overhead-signal codings are independent of each other. Accordingly, the network terminator encoding the overhead information does not need to have any knowledge of the modulation method of the upstream terminal equipment and can employ any method, preferably one which is technically simple, to optically encode the overhead signal. Merely the corresponding network terminators and terminals must each use the same encoding method.

Figure 3:
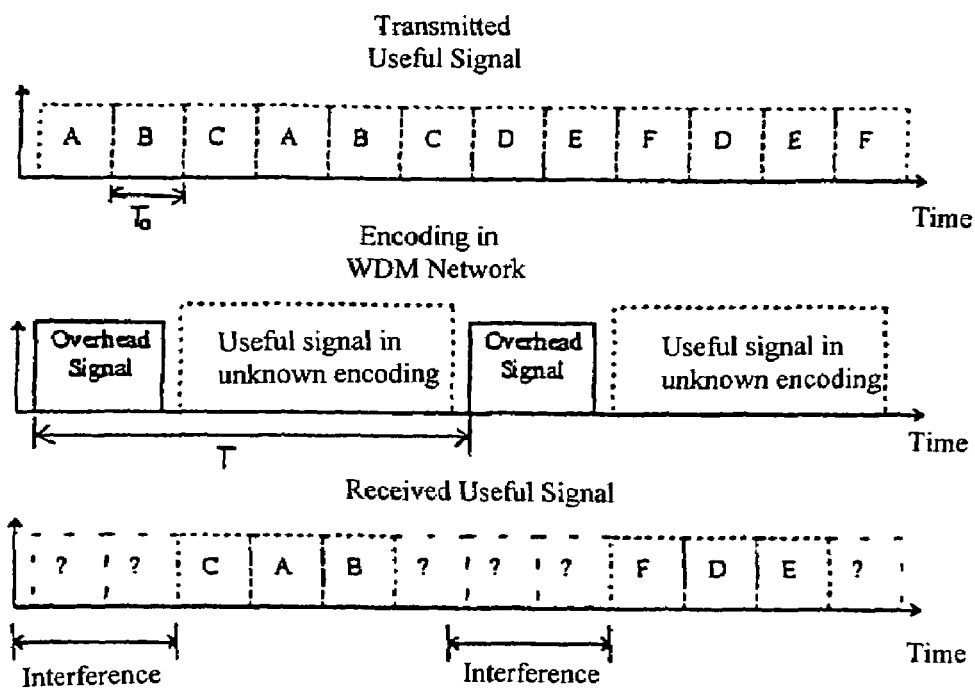
FIG. 3 illustrates an example of the timing of the transmitted and received useful signal, as well as of the encoding in the WDM network.

FIG. 3 illustrates an example of the time characteristic of the transmitted and received useful signals (top and bottom time rays, respectively), as well as of the coding in the WDM network (middle time ray). The useful information, symbolically represented by the letters "A" to "F", is transmitted, with redundancy over time, via the medium, e.g. an optical network as shown in FIG. 1. In this context, the top time ray schematically shows the useful signal transmitted by the terminal equipment before it is fed into the optical network at the network terminator. Instead of transmitting the useful information at regular time intervals, the method according to the present invention provides for overhead information to be transmitted for a certain time interval at the same wavelength as the useful signal, the overhead information being inserted into the signal stream at the network terminator. For this, the useful information, present in any desired coding, is suppressed, and the overhead information, encoded independently thereof, is inserted. The useful and overhead information is transmitted collectively via the same optical channel with the WDM network. The bottom time ray shows the useful signal present at the terminal at the receiving end. Although the useful information has not been received in full due to insertion of the overhead information, the gaps in transmission, identified by "?", are not so great as to render the reconstruction of the original message impossible.

In this schematic representation, the useful signal is transmitted at a defined clock frequency in information blocks of duration $T_0$, identified here by the segments "A, B, C . . . ". Transmitting the overhead information results each time in an entire signal block being disturbed and not being able to be received by the terminal. Therefore, it may be advantageous if the transmission of the overhead information is coordinated in time with the transmission of the useful information, in particular if the transmission of the overhead information always begins just after an entire block of useful information has been transmitted. To reconstruct the useful information, use is made of error correction algorithms which have been optimized for such block disturbances.

Figure 4:
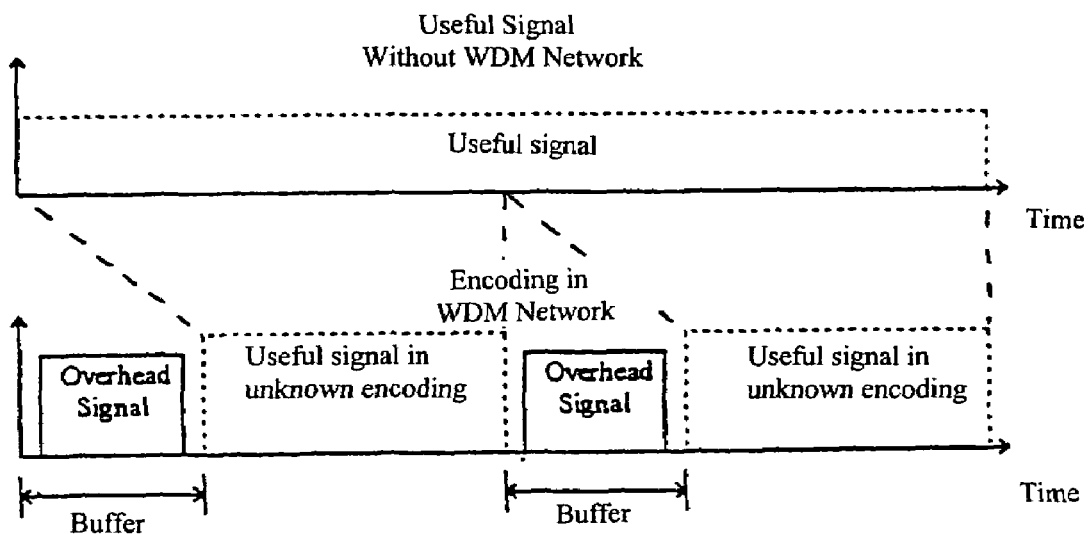
FIG. 4 shows a further example of the timing of the useful signal prior to encoding, as well as of the useful and overhead signal during transmission over the WDM network.

FIG. 4 illustrates a further example of the time characteristic of the useful signal prior to the coding, as well as of the useful and overhead signals during transmission via the WDM network. The useful signal is shown prior to the coding, e.g. at the input of the transmitting receiver equipment, in the top time ray. It is supplied to the transmitting terminal equipment at a constant bit rate per unit of time. Accordingly, it must also arrive at the receiving-end terminal at this time-averaged bit rate if no useful information is to be lost. Therefore, one version of the method according to the present invention provides that the useful signal, which must be transmitted at a constant bit rate over time, is briefly buffered during the transmission of the overhead information, e.g. in shift registers, in order then to be transmitted in the intervening time at a correspondingly higher bit rate. For this, the transmitting terminal and the corresponding network terminator agree on the time when the overhead signal is to be transmitted in place of the useful signal. The transmitting terminal buffers the useful signal for the duration of the transmission and, after the overhead information ends, initiates the renewed transmission of the useful information at an elevated bit rate in relation to the stream of information arriving at the transmitting terminal.

The present invention is advantageously applied in the field of telecommunications. Using the known network components, the method permits signaling and control information to be transmitted in transparent fashion via the same optical channel as the useful information, thereby facilitating, in particular, the monitoring of the transmission quality.

What is claimed is:

1. A method for transmitting signaling and control information for a wavelength-division multiplex network that performs an optical, fiber-bound information transfer in a digitized form, comprising:

using a terminal to process useful information according to one of an optical encoding and an optical decoding;

performing one of:
feeding at a network terminator the useful information into the wavelength-division multiplex network as an optical signal having a defined fundamental wavelength, and
removing at the network terminator the useful information from the wavelength-division multiplex network as the optical signal having the defined fundamental wavelength;

transmitting collectively a plurality of signals having different wavelengths in an optical fiber;

performing one of a generation and an analysis of the signaling and control information in one of the network terminator and in a further network element;

performing one of:
feeding the signaling and control information into the wavelength-division multiplex network, and
removing the signaling and control information from the wavelength-division multiplex network;

using a time-division multiplex operation to transmit the signaling and control information with the defined fundamental wavelength via the same components of the wavelength-division multiplex network as the corresponding useful information, wherein the signaling and control information is modulated independently of the useful information; and transmitting the signaling and control information at regular time intervals T for a predetermined duration of $T_{OH}$, wherein the signaling and control information includes a characteristic signal sequence by which the signaling and control information is capable of being identified in a signal stream of the useful information such that corresponding transmitters and receivers of the signaling and control information are synchronized, and wherein a synchronization between a transmitter and a receiver of the signaling and control information being accomplished by a characteristic signal being transmitted at brief intervals, and following the synchronization, the characteristic signal being transmitted at variable duration time intervals that gradually increase up to a duration of the regular time intervals T.

2. A method for transmitting signaling and control information for a wavelength-division multiplex network that performs an optical, fiber-bound information transfer in a digitized form, comprising:

using a terminal to process useful information according to one of an optical encoding and an optical decoding;

performing one of:
feeding at a network terminator the useful information into the wavelength-division multiplex network as an optical signal having a defined fundamental wavelength, and
removing at the network terminator the useful information from the wavelength-division multiplex network as the optical signal having the defined fundamental wavelength;

transmitting collectively a plurality of signals having different wavelengths in an optical fiber;

performing one of a generation and an analysis of the signaling and control information in one of the network terminator and in a further network element;

performing one of:
- feeding the signaling and control information into the wavelength-division multiplex network, and
- removing the signaling and control information from the wavelength-division multiplex network;

using a time-division multiplex operation to transmit the signaling and control information with the defined fundamental wavelength via the same components of the wavelength-division multiplex network as the corresponding useful information, wherein the signaling and control information is modulated independently of the useful information;

transmitting the signaling and control information at regular time intervals T for a predetermined duration of $T_{OH}$; and during the transmission of the signaling and control information, interrupting the transmission of the useful information for a duration of $T_{OH}+2\ \delta$, wherein the time interval $\delta$ exists between a suppression of the useful information and the transmission of the signaling and control information, wherein the signaling and control information includes a characteristic signal sequence by which the signaling and control information is capable of being identified in a signal stream of the useful information such that corresponding transmitters and receivers of the signaling and control information are synchronized.

3. The method according to claim 2, further comprising the steps of:
- during the interruption lasting for the duration of $T_{OH}+2\ \delta$ resulting from the transmission of the signaling and control information, buffering the useful information in a transmitting terminal equipment; and
- during an intervening interval with a duration of $T-(T_{OH}+2\ \delta)$, transmitting the useful information at such an increased bit rate that an average bit rate corresponds to an uninterrupted useful information transfer.

4. The method according to claim 3, wherein the transmitting terminal equipment includes shift registers.

5. The method according to claim 3, further comprising the steps of:
- causing the transmitting terminal equipment to reserve time gaps of the duration $T_{OH}+2\ \delta$ in the useful information; and
- causing the transmitting terminal equipment to signal a temporal position of the reserved time gaps via the network terminator to a network element transmitting the signaling and control information.

6. The method according to claim 3, further comprising the steps of:
- causing the network terminator to inform the transmitting terminal equipment of when a time gap having the duration of $T_{OH}+2\ \delta$ in the useful information is to be reserved for the transmission of the signaling and control information; and
- causing the network terminator to inform the transmitting terminal equipment of when the useful information is to be buffered.

7. The method according to claim 3, further comprising the steps of:
- causing the network terminator to communicate the signaling and control information to the transmitting terminal;
- causing the transmitting terminal to optically encode the signaling and control information and transmit the signaling and control information via the wavelength-division multiplex network; and
- causing a receiving terminal provided with the encoded useful information to:
  - decode the signaling and control information,
  - filter out the signaling and control information from the useful information, and
  - communicate the signaling and control information to an upstream receiver-end network terminator.

* * * * *